United States Patent [19]
Tanikawa et al.

[11] Patent Number: 5,606,994
[45] Date of Patent: Mar. 4, 1997

[54] THREE WAY SWITCHING CONTROLLER

[75] Inventors: Tsuyoshi Tanikawa; Kenji Yamamoto, both of Osaka, Japan

[73] Assignee: Fujikin Incorporated, Osaka, Japan

[21] Appl. No.: 515,001

[22] Filed: Aug. 14, 1995

[30] Foreign Application Priority Data

Aug. 30, 1994 [JP] Japan .................................. 6-204828

[51] Int. Cl.⁶ ............................................. F16K 7/17
[52] U.S. Cl. ............................... 137/627.5; 251/77
[58] Field of Search ............................ 137/627.5; 251/77

[56] References Cited

U.S. PATENT DOCUMENTS

| | | | |
|---|---|---|---|
| 3,018,797 | 1/1962 | Parks | 251/77 |
| 3,298,395 | 1/1967 | Lewis | 251/77 |
| 3,332,440 | 7/1967 | Brakebill | 251/77 |
| 3,974,861 | 8/1976 | Goto et al. | 137/627.5 |
| 4,867,201 | 9/1989 | Carten | 251/77 |
| 5,065,665 | 11/1991 | Kimura | 137/627.5 |

*Primary Examiner*—James Larson
*Attorney, Agent, or Firm*—Griffin, Butler, Whisenhunt & Kurtossy

[57] ABSTRACT

A three way switching controller (1) for handling high purity gas, and the like, used for a semiconductor manufacturing plant, and the like, prevents lines on switching sides thereof from communicating with each other at time of switching. The three way switching controller includes a body (2), first and second valves (3 and 4), a cylinder (5), and a linking mechanism (6), with the linking mechanism including a disengagement device (7). The cylinder, operating through the linking mechanism, alternately opens and closes normally-closed valves. The disengagement device prevents a driving force of the cylinder from being applied at once to the valves upon initiation of operation of the cylinder, thereby allowing both of the valves to be in a free state (closed state).

9 Claims, 5 Drawing Sheets

THREE WAY SWITCHING CONTROLLER

BACKGROUND OF THE INVENTION

This invention relates to an improvement of a three way switching controller for handling high purity gas, and the like, used in semiconductor manufacturing plants, for example.

The three way switching controller shown in FIGS. 6 and FIG. 7 is an example, of a prior art three way switching controller of this type.

This three way switching controller 50 basically includes a body 56 having: openings 51, 52, and 53; a passage 54 communicating with the openings 51 and 52; a passage 55 communicating with the openings 51 and 53; two normally-closed valves 57 and 58 on the body 56 for opening and closing the passages 54 and 55; and two cylinder/piston mechanisms (herein often referred to only as cylinders) 59 and 60 for opening and closing valves 57 and 58. To openings 51, 52 and 53 (represented by 51a, 52b, and 53c in the diagram of the FIG. 5 for illustrative purposes only) are respectively connected a load (not shown) of a semiconductor manufacturing device (and the like), a source of a first gas A, and a source of a second gas B. Each of the cylinders 59 and 60 is a single acting air cylinder and connected to a source of compressed air by a respective electromagnetic valve, which valves are not shown.

This three way switching controller 50 is designed to cause the valves 57 and 58 to open and close alternately by causing the cylinders 59 and 60 to operate alternately. Namely, when one cylinder 59 is operated to cause the valve 57 thereof to open, operation of the other cylinder 60 is stopped and the valve 58 thereof is allowed to be in its normally closed state. And further, when operation of the one cylinder 59 is stopped, and the valve 57 thereof is allowed to close, the other cylinder 60 is operated and its valve 58 is thereby opened.

However, in a three way switching controller such as this, because both cylinders 59 and 60 are operated simultaneously, both valves 57 and 58 are caused to be opened for a moment and there is a moment when both passages 54 and 55 of the body communicate with one another via passage 51. In other words, when the three way switching controller is switched, lines on the switching sides are connected to each other. Therefore, it has been necessary to prevent both cylinders 59 and 60 from operating simultaneously by shifting the timing of electromagnetic valves which control operation of each cylinder 59 and 60 for supplying the working fluid.

However, in order to provide a time difference for operation of the respective electromagnetic valves, a controller of the electromagnetic vales must be relatively complicated, thereby increasing manufacturing costs of the three way switching controller.

It is an object of the present invention to provide a three way switching controller of simple construction which prevents the lines on the switching sides from being connected to each other at times of switching.

SUMMARY OF THE INVENTION

According to principles of this invention, a three way switching controller basically includes a body having: a first opening, a second opening, and a third opening; two passages respectively communicating the first opening with the second opening and the first opening with the third opening; two normally-closed valves on the body for opening and closing the passages; cylinder on the body; and a linking mechanism between the cylinder and the valves for alternately opening and closing the valves by operation of the cylinder. The linking mechanism includes a disengagement device for allowing the normally-closed valves to close by preventing a driving force from being applied to the valves by the cylinder for a moment immediately after initiation of operation of the cylinder.

When the cylinder is operated, valves are alternately opened and closed by the linking mechanism. In other words, when the first valve is in an opened state, the second valve is in a closed state, and when the first valve is in a closed state, the second valve is an opened state.

However, when the cylinder is operated, immediately after initiation of operation thereof (that is, for an initial period of the operation), the valves are placed in a free state by the disengagement device and both valves are allowed to be in a closed state for a short time. Therefore, there is no possibility of communication between the two passages of the body.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
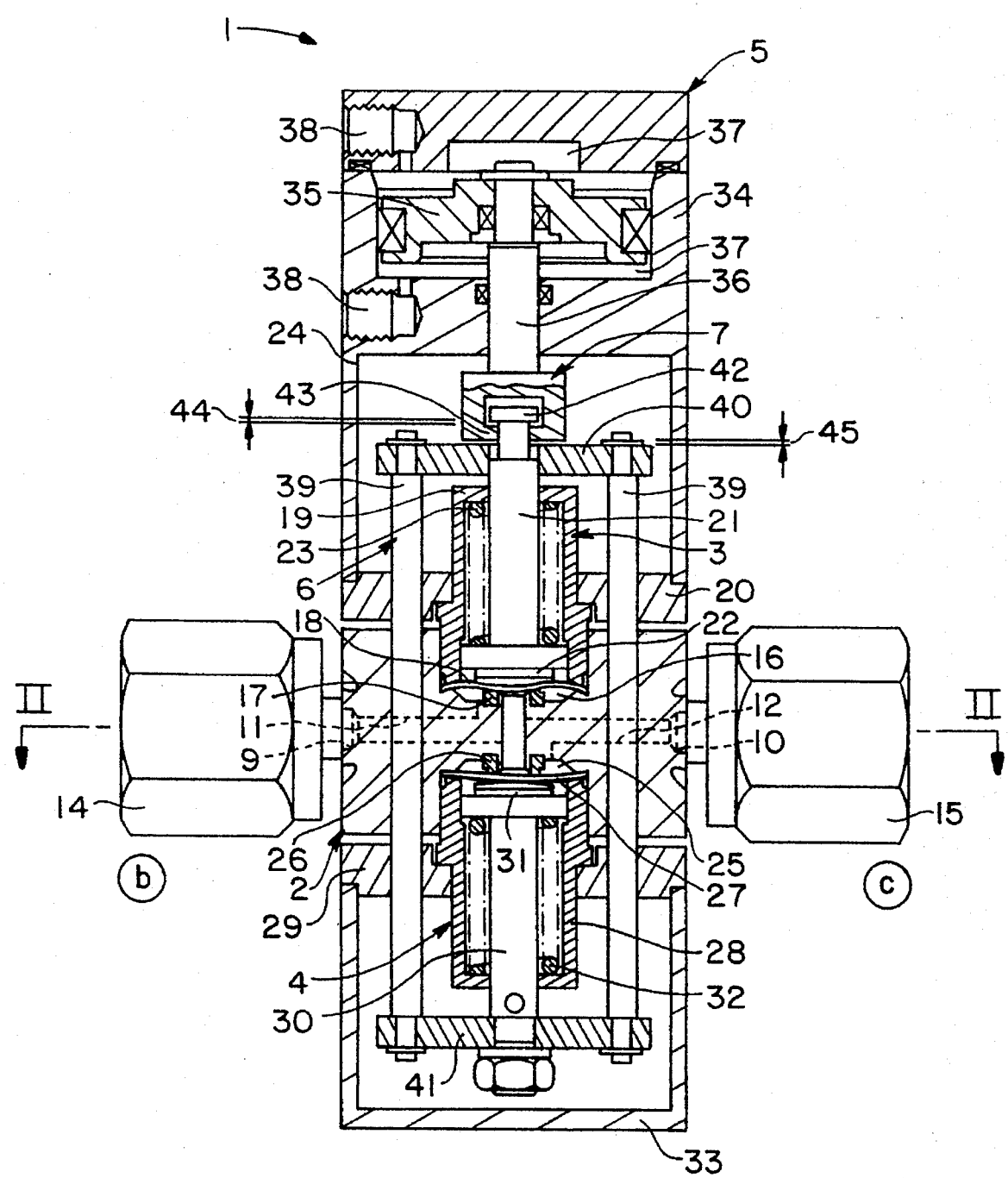
FIG. 1 is vertical cross-sectional view showing a three way switching controller according to an embodiment of the present invention.

It should be understood that when directional terms are used herein, such as "upper", "up", and "down", they indicate only orthogonal directions relative to the elements as they are depicted in the drawings, and are not indications of directions relative to the earth.

A three way switching controller 1 basically comprises a body 2, a first valve 3, a second valve 4, a cylinder 5, and a linking mechanism 6 having a disengagement device 7. In the three way switching controller of this embodiment the first and second valves 3 and 4 are normally-closed valves so that they will be closed when no operating pressure is applied to the cylinder 5.

The body 2 is an integral, one-piece, component defining a first opening 8, a second opening 9, a third opening 10, a first passage 11 communicating the first opening 8 to the second opening 9, and a second passage 12 communicating the first opening 8 to the third opening 10, with the body 2 being made of stainless steel to have a rectangular form. In other words, the first opening 8 (outlet a) is formed on the front side (lower side in FIG. 2), the second opening 9 (a first inlet b) is formed on the left side (left side in FIGS. 1 and 2), the third opening 10 (a second inlet C) is formed on the right side, the first passage 11 is formed between the first opening 8 and the second opening 9 communicating with these openings, and the second passage 12 is formed between the first opening 8 and the third opening 10 communicating with these openings.

First through third coupling joints 13, 14, and 15 are respectively connected to the body 2 at the openings 8, 9, and 10. Each of these coupling joints comprises a stainless steel sleeve welded to the body 2, a stainless steel union nut externally fitted thereto, and a pure ring provided therebetween.

Figure 3:
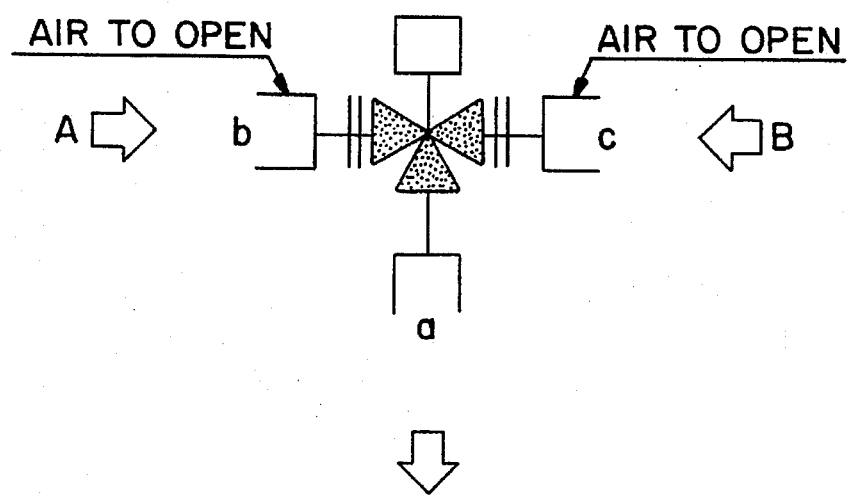
FIG. 3 is a flow diagram of the valve of FIG. 1.

To the coupling joints 13, 14, and 15, see FIG. 3, are respectively connected: a load (not shown) of a semiconductor manufacturing device or the like, a supply source of a first gas A, and a supply source of a second gas B.

The first valve 3 and the second valve 4 are provided on the body 2 for respectively opening and closing the first and second passages 11 and 12, with these valves being held in a normally-closed state when operating force from the cylinder 5 is not applied. In this embodiment the first valve 3 is at the upper side of the body 2 for opening and closing the first passage 11 and the second valve 4 is at the lower side of the body 2 for opening and closing the second passage 12. These components are of similar construction, and each of them is a normally-closed valve of a metal diaphragm type, arranged to linearly oppose each other in a vertical direction, with the body 2 being therebetween.

The first valve 3 is formed halfway along the first passage 11 at the upper side of the body 2. This first valve 3 comprises: a first valve chamber surface for defining a first valve chamber 16, the first valve chamber surface being concave in shape at a lower side of the first valve chamber 16, with an upper side of the first valve chamber 16 being open; a first valve seat 17 made of synthetic resin in annular shape and being on the first valve chamber surface at the bottom of the first valve chamber 16; a first diaphragm 18 made from thin metallic sheet, such as stainless steel or INCONEL (trade name) positioned in the first valve chamber 16 for maintaining airtightness in the first valve chamber 16 and for contacting and moving away from the first valve seat 17 as a center portion of the first diaphragm 18 respectively moves down and up; a first bonnet 19 made from metal in cylindrical shaped and inserted in the first valve chamber 16 to hold an outer circumference of the first diaphragm 18 airtight against the body 2; a first bonnet holder 20 to press the first bonnet 19 toward the body 2; a plurality of bolts (not shown) to secure the first bonnet holder 20 to the body 2; a first stem 21 made of metal and supported for vertical movement on the first bonnet 19; a first diaphragm holder 22 at a lower tip of the first stem 21 to contact a center portion of the first diaphragm 18; and a first spring 23 to cause the first diaphragm 18 to contact the first valve seat 17 by pushing the first stem 21 downwardly. A first cover 24 to generally cover the first valve 3 and a plurality of bolts (not shown) to secure the first cover 24 to the first bonnet holder 20 are on the upper side of the first bonnet holder 20.

The second valve 4 is formed halfway along the second passage 12 at the lower side of the body 2. This second valve 4 comprises: a second valve chamber surface for defining a second valve chamber 25, the second valve chamber surface being concave in shape at an upper side of the second valve chamber 25, with a lower side of the second valve chamber 25 being open; a second valve seat 26 made of synthetic resin in annular shape and being embedded in the second valve chamber surface at the bottom of the second valve chamber 25; a second diaphragm 27 made from thin metallic sheet, such as stainless steel or INCONEL (trade name) positioned in the second valve chamber 25 for maintaining airtightness in the second valve chamber 25 and for contacting and moving away from the second valve seat 26 as a center portion of the second diaphragm 27 respectively moves up and down; a second bonnet 28 made from metal in cylindrical shape and inserted in the second valve chamber 25 to hold an outer circumference of the second diaphragm 27 airtight against the body 2; a second bonnet holder 29 to push the second bonnet 28 toward the body 2; bolts (not shown) to secure the second bonnet holder 29 to the body 2; a second stem 30 made of metal and supported for vertical movement on the second bonnet 28; a second diaphragm holder 31 at a top tip of the second stem 30 to contact a center portion of the second diaphragm 27; and a second spring 32 to cause the second diaphragm 27 to contact the second valve seat 26 by pushing the second stem 30 upwardly. A second cover 33 to generally cover the second valve 4 and a plurality of bolts (not shown) to secure the second cover 33 to the second bonnet holder 29 are on the lower side of the second bonnet holder 29.

Figure 2:
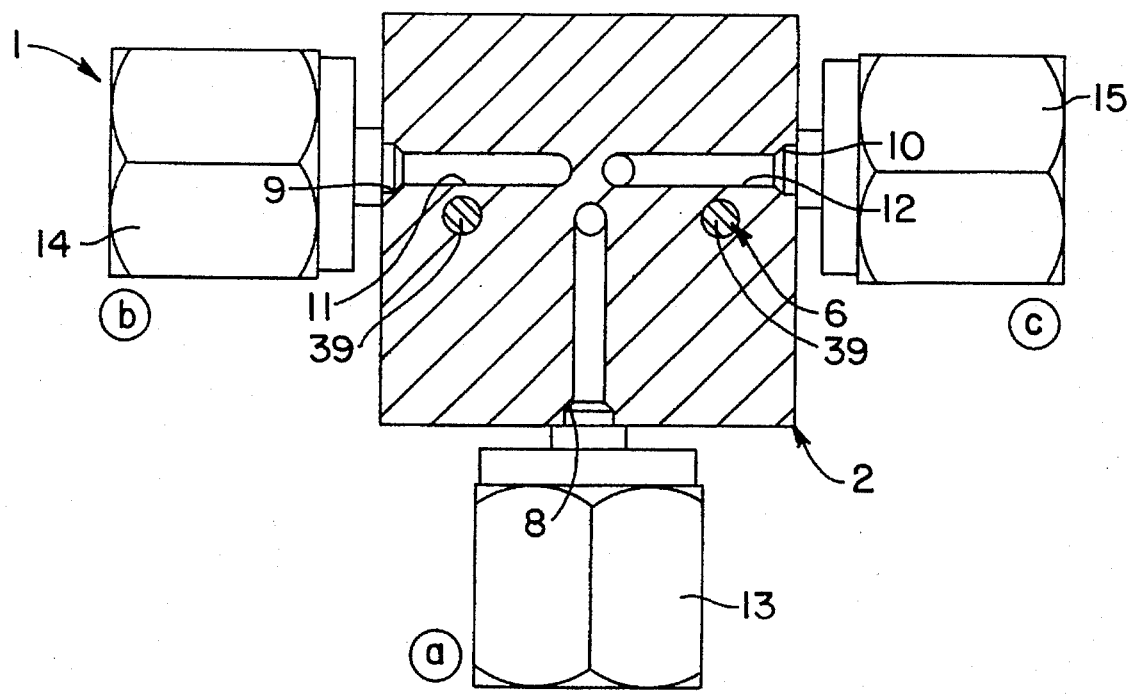
FIG. 2 is a partially-cutaway transverse plan view taken on line II—II of FIG. 1.

The cylinder 5 is an integral component provided on the body 2. In this embodiment, a double acting air cylinder is used which can produce three states: the state where a piston rod 36 is pulled upwardly (retracted state); the state where a piston 35 is as shown in FIG. 1 (neutral state); and the state where the piston rod 36 is pushed downwardly (extended state). The cylinder 5 is supported at the upper end of the body 2 by the first cover 24 and is linearly arranged with the body 2 and the first and second valves 3 and 4. The cylinder 5 includes: a cylinder body 34 at the upper end of the first cover 24; the piston 35 inside of the cylinder body 34; the vertically movable piston rod 36 whose upper end is secured to the piston 35 and whose lower end penetrates downward through the cylinder body 34; upper and lower cylinder chambers 37 formed in the cylinder body 34 above and below the piston 35; and upper and lower ports 38 communicating with these cylinder chambers 37. A source of compressed air is connected to the upper and lower ports 38, though this is not shown in the drawing, by way of an electromagnetic valve.

The linking mechanism 6 is provided between the cylinder 5 and the valves 3 and 4 in order to alternately open and close the valves 3 and 4 by operation of the cylinder 5. This embodiment is designed such that: when the cylinder 5 is in the neutral state, both valves 3 and 4 are closed; when the cylinder 5 is in the retracted state, the first valve 3 is opened and the second valve 4 is closed; and when the cylinder 5 is in extended state, the first valve 3 is closed and the second valve 4 is opened. More particular, the linking mechanism 6 comprises: right and left rods 39 and 39 movable vertically and extending through the body 2, the first bonnet holder 20, and the second bonnet holder 29; a first plate 40 which connects upper end parts of the rods 39 and 39 and, through a middle part of which, an upper part of the first stem 21 is movable vertically; a second plate 41 connecting lower end parts of both rods 39, with a middle of the second plate 41 being fixed to a lower end part of the second stem 30; a first engaging piece 42 having a "T" cross sectional shape formed on an upper end part of the first stem 21; and a second engaging piece 43 of crown shape at a lower end part of the piston rod 36 of the cylinder 5 to engage the first engaging piece 42 so as to move the first stem 21 upwardly when the second engaging piece 43 moves upwardly and to engage the first plate 40 so as to move it downwardly when the second engaging piece 43 moves downwardly.

The disengagement device 7 is provided in a portion of the linking mechanism 6 to allow the valves 3 and 4 to be in a free state immediately after initiation of operation of the cylinder 5. In this embodiment, when the cylinder 5 retracts from the neutral state, the system is so designated that this operation of the cylinder 5 is not transferred immediately through the linking mechanism 6 because the disengagement means 7 has a first gap 44 between the first engaging piece 42 and the second engaging piece 43 and a second gap 45 between the second engaging piece 43 and the first plate 40 within the linking mechanism 6.

Operation of the system will now be explained based on the above-described construction.

In FIG. 1, the cylinder 5 is shown in the neutral state with the valves 3 and 4 being closed.

When compressed air is supplied to the lower port 38 of the cylinder 5, the piston 35 and the piston rod 36 are moved upwardly, and the cylinder 5 is placed in the retracted state.

When the cylinder 5 is placed in the retracted state, the first engaging piece 42 and the second engaging piece 43 of the linking mechanism 6 are caused to contact, and the first stem 21 is moved upwardly, overcoming a pressing force of the first spring 23. By this action, the first diaphragm 18 moves away from the first valve seat 17, causing the first valve 3 to be placed in an open state. When the first valve 3 is caused to be opened, the first gas A flows successively from the second coupling joint 14 through the second opening 9, to the first passage 11, to the first opening 8, and to the first coupling joint 13, in that order. At this time, the second engaging piece 43 and the first plate 40 of the linking mechanism 6 separate and the normally-closed second valve 4 is therefore held in a closed state, as in FIG. 1. When the second valve 4 is held in the closed state, flow of the second gas B from the third coupling joint 15 to the first coupling joint 13 remains shut off.

Further, when compressed air is supplied to the upper port 38 of the cylinder 5 in the state of FIG. 1, the piston 35 and the piston rod 36 are moved downwardly, and the cylinder 5 is placed in the extended state.

When the cylinder 5 is placed in the extended state, the second engaging piece 43 and the first plate 40 of the linking mechanism 6 are caused to contact, and the second stem 30 is moved downwardly, thereby overcoming the second spring 32 by means of the rods 39 and the second plate 41. As a result, the second diaphragm 27 moves away from the second valve seat 26, causing the second valve 4 to be placed in an open state. When the second valve 4 is thusly caused to be opened, the second gas B flows successively from the third coupling joint 15 through the third opening 10, to the second passage 12, to the first opening 8, and to the first coupling joint 13, in that order. As this happens, the first engaging piece 42 and the second engaging piece 43 of the linking mechanism 6 are caused to separate and the first valve 3 is maintained in a closed state as in FIG. 1. When the first valve 3 is held closed, the flow of the first gas A from the second coupling joint 14 to the first coupling joint 13 is shut off.

When the cylinder 5 is moved in either direction between the extended and retracted states, thereby passing through the neutral state, the valves 3 and 4 are both initially released, or caused to be in free states, due to the first gap 44 and the second gap 45 of the disengagement means 7, and only after both valves are held in these closed states for a short time, will one of the valves be opened. Therefore, because no communication between passages 11 and 12 of the body 2 will take place, the first gas A and the second gas B are never mixed, and a flowing of a mixture of the gases to a semiconductor manufacturing device, or the like, is completely prevented.

Next, a second embodiment of the present invention will be explained based on FIGS. 4 and 5.

The second embodiment is different from the first embodiment in that: (1) a cylinder 5' which is caused to be in either a retracted state or extended state, is a single acting air cylinder which is normally caused to be in an extended state by a spring 46; (2) a linking mechanism 6' is constructed such that the first valve 3 is caused to be in a closed state and the second valve 4 is caused to be in an open state when the cylinder 5' is extended; and (3) a disengagement means 7' comprises only a first gap 44' formed between the first engaging piece 42 and the second engaging piece 43.

Figure 4:
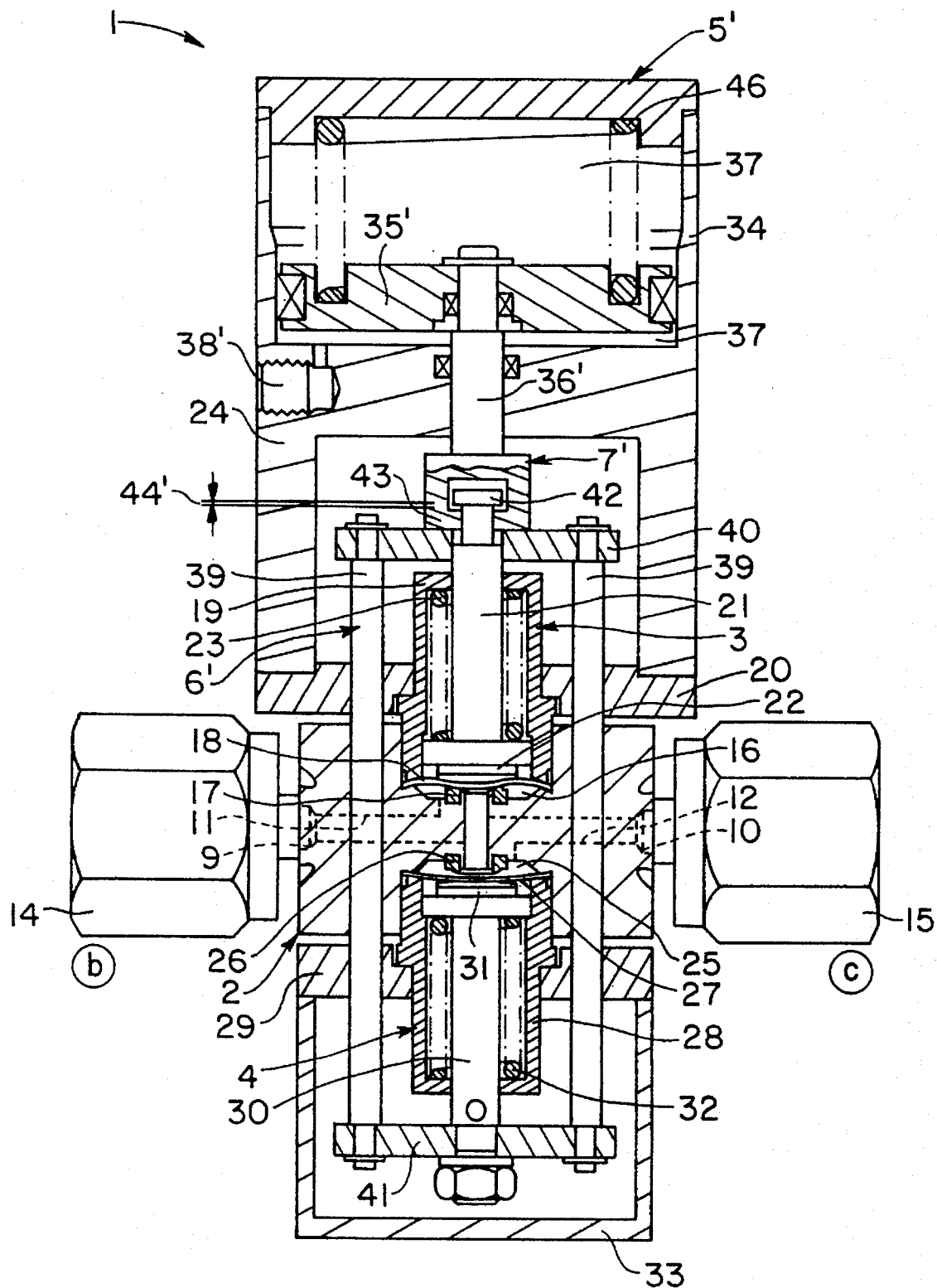
FIG. 4 is a vertical cross-sectional view similar to FIG. 1 showing a three way switching controller according to a second embodiment of the present invention.
Figure 5:
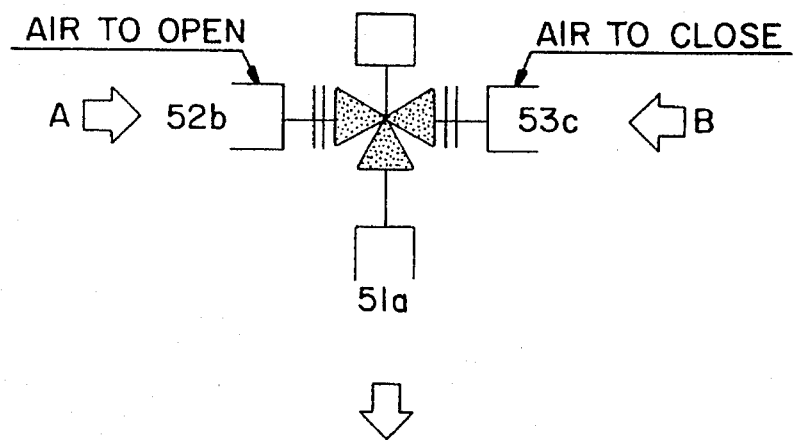
FIG. 5 is a flow diagram of the valve of FIG. 4.
Figure 6:
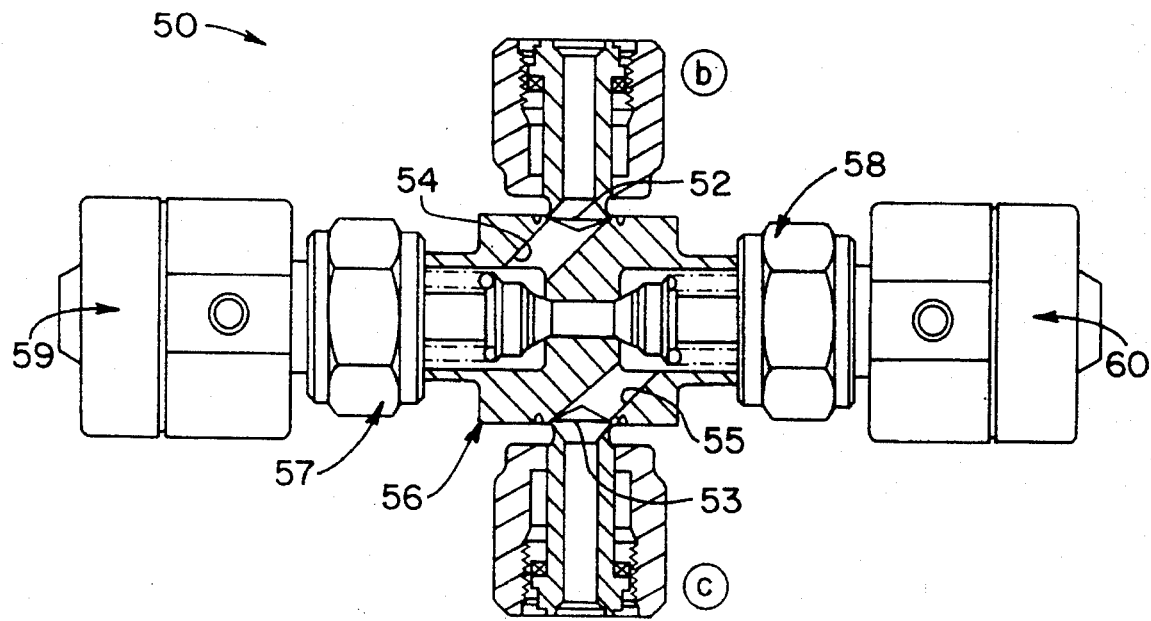
FIG. 6 is a vertical front, partially-cutaway, view showing a conventional, prior-art, three way switching controller.
Figure 7:
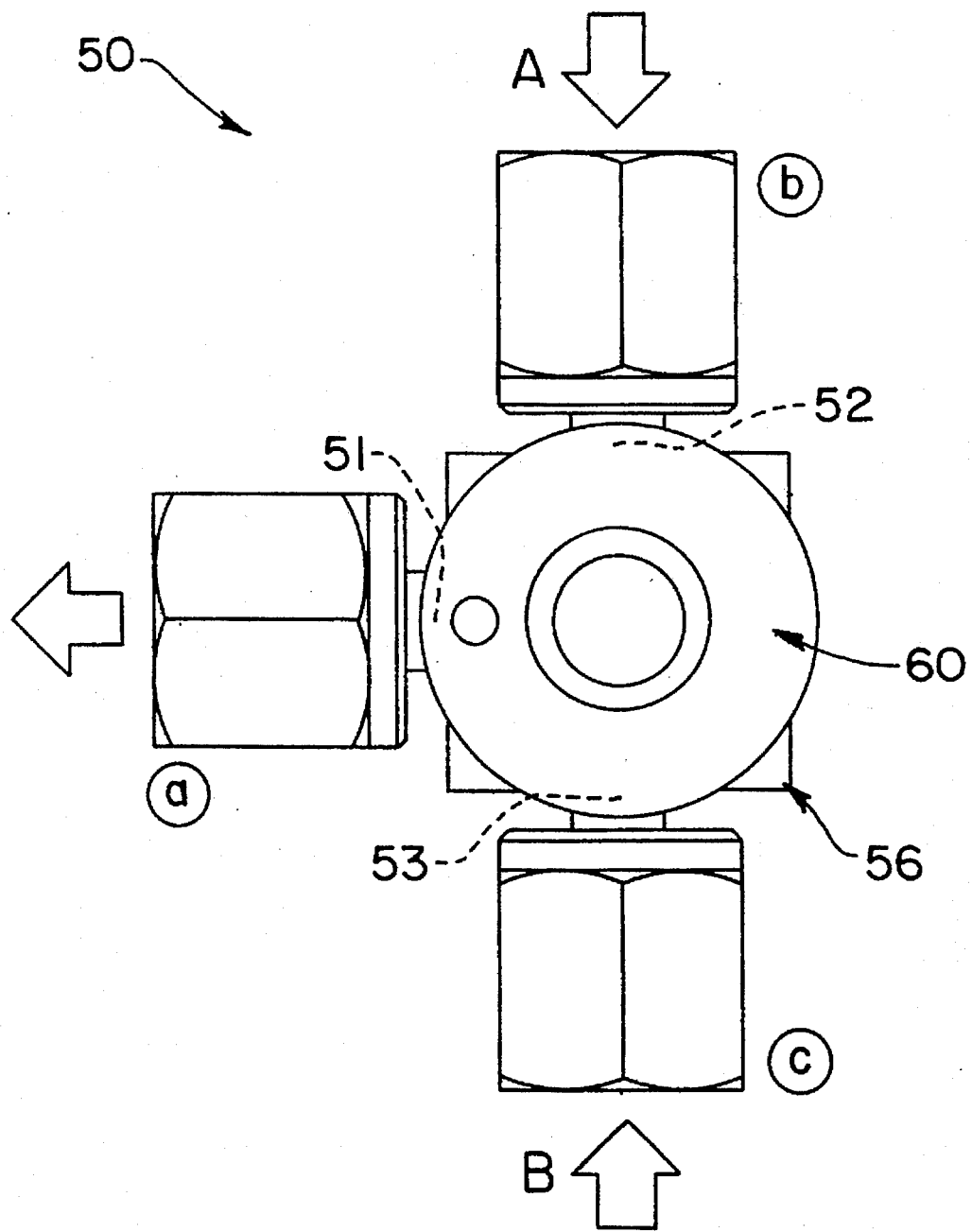
FIG. 7 is a side view of the structure shown in FIG. 6.

In a three way switching controller of the second embodiment, normally, the cylinder 5' is in the extended state as shown in FIG. 4, and the first valve 3 is in the closed state and the second valve 4 is in opened state.

When compressed air is supplied to the port 38' of the cylinder 5' in the state of FIG. 4, a piston 35' and a piston rod 36' are moved upwardly, overcoming the spring 46, and the cylinder 5' is placed in a retracted state. When the cylinder 5' is thusly placed in a retracted state, the first engaging piece 42 and the second engaging piece 43 of the linking mechanism 6 are caused to contact after a very short delay in time, and the first stem 21 is moved upwardly, overcoming the first spring 23. By this action, the first diaphragm 18 is separated from the first valve seat 17 and the first valve 3 is caused to be opened. When the first valve 3 is opened, the first gas A flows successively from the second coupling joint 14 through the second opening 9, to the first passage 11, to the first opening 8, and to the first coupling joint 13, in that order.

On the other hand, as regards the second valve 4, the second stem 30, the second plate 41, the rods 39, and the first plate 30 are moved upwardly by the second spring 32 of the second valve 4, with the first plate 40 being held in contact with the second engaging piece 43 as the second engaging piece 43 is moved upwardly. As a result, the second valve 4 is immediately caused to be closed without a delay in time. When the second valve 4 is thusly caused to close, flow of the second gas B from the third coupling joint 15 to the first coupling joint 13 is shut off.

When the supply of compressed air to the port 38' of the cylinder 5 is stopped in the above-mentioned state and air pressure is decreased, the piston 35' and the piston rod 36' are moved downwardly by the spring 46, and the cylinder 5' is moved to the extended state. When the cylinder 5' is thusly "extended", the second engaging piece 43 and the first plate 40 of the linking mechanism 6 are caused to contact after a very short delay in time, so that the first plate 40, the rods 39, the second plate 41, and the second stem 30 are moved downwardly, overcoming the second spring 32, thereby causing the second diaphragm 27 to separate from the second valve seat 26, and the second valve 4 is opened as shown in FIG. 4. When the second valve 4 is thusly opened, the second gas B flows successively from the third coupling joint 15 through the third opening 10, to the second passage 12, to the first opening 8, and to the first coupling joint 13, in that order.

On the other hand, as regards the first valve 3, the first stem 21 is moved downwardly, following the piston rod 36', by force of the first spring 23, and the first diaphragm 18 thereby contacts the first valve seat 17. By this action, the first valve 3 is closed immediately, without any delay in time.

Further, when the above-mentioned second valve 4 is open, the first engaging piece 42 and the second engaging piece 43 of the linking mechanism 6' are separated, and the first valve 3 is held closed, as shown in FIG. 4. When the first valve 3 is held closed, flow of the first gas A from the second coupling joint 14 to the first coupling joint 13 is shut off.

As has been described above, as the cylinder 5' is extended and retracted, the valves 3 and 4 are caused to be released, or placed in a free state, at the beginning of operation of the cylinder 5' due to the first gap 44' of the disengagement means 7', and both valves 3 and 4 are held closed for a short time. Thus, because only one of the valves is thereafter opened, communication between the passages 11 and 12 of the body 2 will not take place, so that the first gas A and the second gas B are never mixed, and a mixture of the gases cannot be sent to a semiconductor manufacturing device, or the like.

In a three way switching controller of the second embodiment, because the cylinder 5' is a single acting type cylinder, single piping for supplying compressed air can be used, resulting in a simplified control system.

While the invention has been particularly shown and described with reference to a preferred embodiment, it will be understood by those of ordinary skill in the art that various changes in form and detail may be made therein without departing from the spirit and scope of the invention.

For example, as regards the body 2 in the previously described embodiments, two of the three openings 8, 9, and 10 are used as the inlet and the other of the three openings 8, 9, 10 is used as the outlet, but the present invention is not limited only to such an arrangement and one of the three openings 8, 9, and 10 may be used as the inlet while the other two may be used as outlets.

In the previously described embodiments, the valves 3 and 4 are provided opposite one another with the body 2 being positioned therebetween, but the present invention is not limited only to such an arrangement, and the valves may be arranged side by side, for example.

In the described embodiments, the linking mechanism 6, 6' includes the rods 39, plates 40 and 41 and first and second engaging pieces 42 and 43, but the present invention is not limited only to such an arrangement and may be changed appropriately.

The following excellent effects result from the present invention:

(1) The three way switching controller comprise a body, two valves, a cylinder, and a linking mechanism with disengagement device. One cylinder can be used. The linking mechanism, for alternately opening and closing the valves under operation of the cylinder, is provided between the cylinder and the valves, with the disengagement means, as part of the linking mechanism, setting the valves free (allowing them to close) at the beginning of operation of the cylinder. As a result, lines on the switching sides will not communicate upon switching.

(2) A linking mechanism is provided which allows the overall three way switching controller to be made compactly, since only one cylinder need be used.

(3) A linking mechanism is provided which allows the control system of the cylinder to be uncomplicated, because only one cylinder need be used.

The invention claimed is:

1. A three way switching controller comprising:

a body defining a first opening, a second opening, a third opening, a first passage communicating between said first opening and said second opening, and a second passage communicating between said first opening and said third opening;

a first valve and a second valve mounted on said body for respectively opening and closing said first passage and said second passage, said first and second valves each being held in a closed state when said first and second valves are in a free state, with no external driving force being applied thereto;

a cylinder provided on said body; and a linking mechanism provided between said cylinder and said first valve and said second valve for alternately opening and closing said first and second valves by operation of said cylinder;

wherein said linking mechanism includes a disengagement means for preventing the driving force of the cylinder from being immediately applied to said first and second valves immediately after initiation of operation of the cylinder so as to allow both said first and second valves to be in said free state whereby both said first and second valves are in a closed state for a short time; and, wherein said first valve on said body has a first diaphragm which is caused to seat against a first valve seat by a first stem being driven thereagainst by a first spring and said second valve has a second diaphragm which is caused to seat against a second valve seat by a second stem being driven thereagainst by a second spring.

2. A three way switching controller as in claim 1, wherein said first and second valves are respectively located on first and second opposite sides of said body, opposite one another, and said cylinder is located adjacent said first valve on the first side of said body.

3. A three way switching controller as in claim 1, wherein said cylinder is a double-acting air cylinder having three actuation states, namely, a retracted state, a neutral state, and an extended state.

4. A three way switching controller as in claim 1, wherein said linking mechanism comprises: right and left rods which pass through said body and are movable linearly; a first plate which connects together first ends of the rods and through which an outer end portion of the first stem of the first valve passes; a second plate which connects together opposite second ends of both rods which is affixed to one end of the second valve-actuating stem of the second valve; and wherein said disengagement means is formed of a first engaging piece attached to said first stem and a second engaging piece attached to a piston rod of said cylinder said second engaging piece engaging said first engaging piece for pulling said first stem with the piston rod when said piston rod is retracted and said second engaging piece engaging said first plate for pushing said first plate when said piston rod is extended.

5. A three way switching controller as in claim 4, wherein there is a first gap between the first and second engaging pieces.

6. A three way switching controller as in claim 5, wherein a second gap is formed between the second engaging piece and the first plate.

7. A three way switching controller comprising:

a body defining a first opening, a second opening, a third opening, a first passage communicating between said first opening and said second opening, and a second passage communicating between said first opening and said third opening;

a first valve and a second valve mounted on said body for respectively opening and closing said first passage and said second passage, said first valve being held in closed state and second valve being held in an opened state when said first and second valves are in a free state, with no external cylinder driving force being applied thereto;

a cylinder provided on said body, said cylinder being an air cylinder of single acting type for alternating between a retracted state and an extended state; and a linking mechanism provided between said cylinder and said first valve and said second valve for alternately opening and closing said first and second valves by operation of said cylinder;

wherein said linking mechanism includes a disengagement means for preventing the driving force caused by operation of the cylinder from being immediately applied to said second valve immediately after initiation of operation of the cylinder to open said first valve and close said second valve, whereby both said first and second valves are in a closed state for a short time during a transition from closing one of said first and second valves to open the other of said first and second valves; and wherein said first valve on said body has a first diaphragm which is caused to seat against a first valve seat by a first stem being driven thereagainst by a first spring and said second valve has a second diaphragm which is caused to seat against a second valve seat by a second stem being driven thereagainst by a second spring.

8. A three way switching controller as in claim 7, wherein said linking mechanism comprises: right and left rods which pass through said body and are movable linearly; a first plate which connects together first ends of the rods and through which an outer end portion of the first stem of the first valve passes; a second plate which connects together opposite second ends of both rods which is affixed to one end of the second valve-actuating stem of the second valve; and wherein said disengagement means is formed of a first engaging piece attached to said first stem and a second engaging piece attached to a piston rod of said cylinder, said second engaging piece engaging said first engaging piece for pulling said first stem upwardly when said piston rod is retracted.

9. A three way switching controller as in claim 8, wherein there is a first gap between the first and second engaging pieces.

* * * * *